Nov. 4, 1952 G. A. WAHLMARK 2,616,302
ANTIFRICTION TRANSMISSION
Filed March 6, 1947 3 Sheets-Sheet 1

Inventor:
Gunnar A. Wahlmark,
By Chritton, Schroeder, Merriam & Hofgren,
Attys.

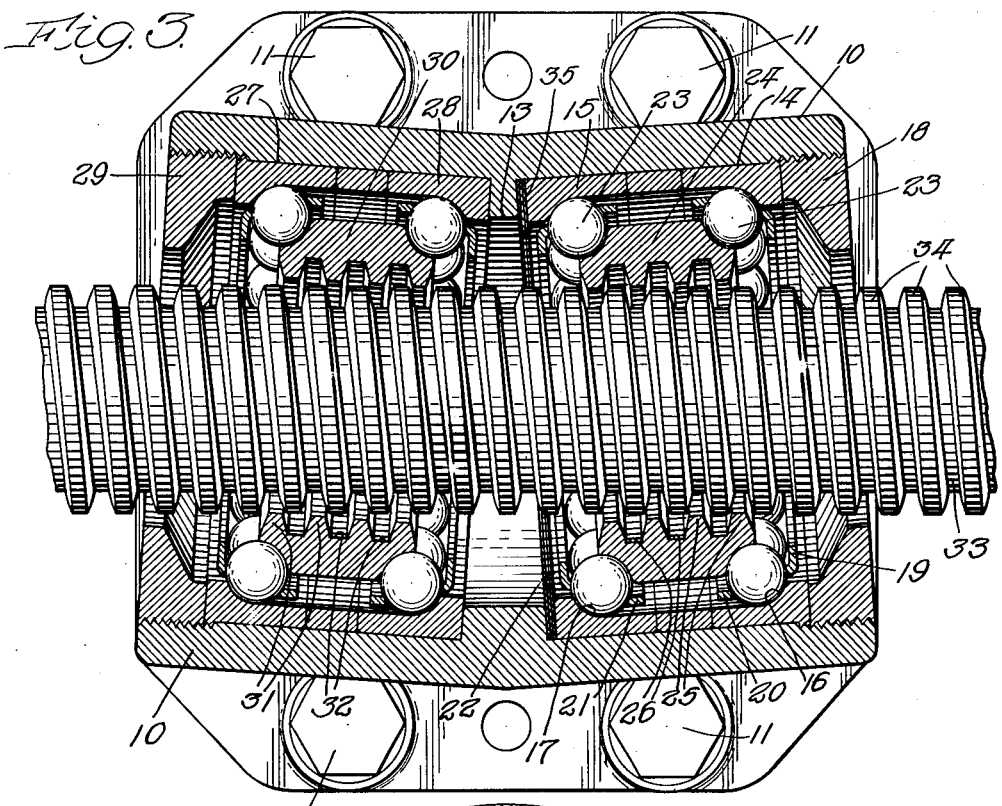
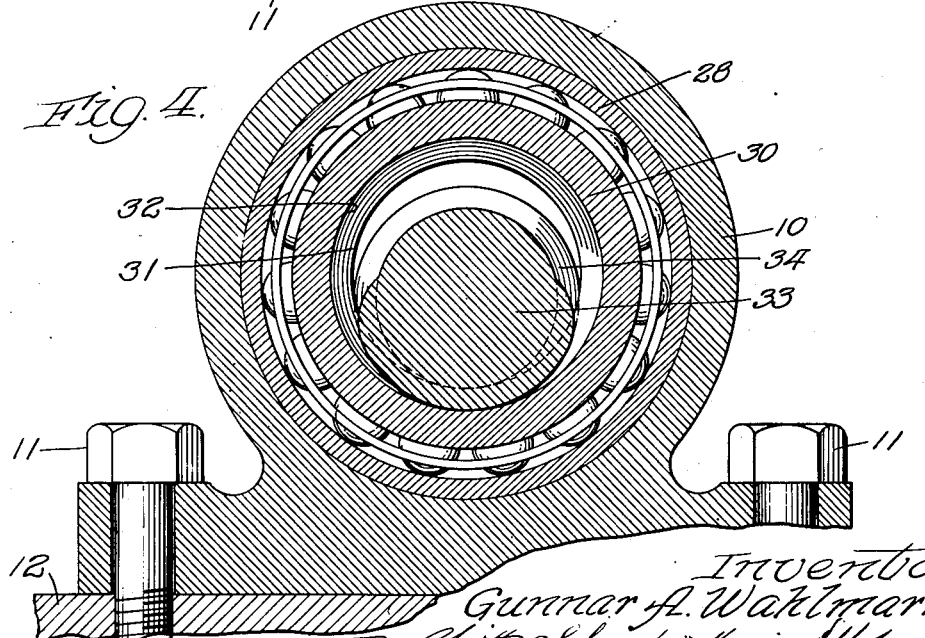

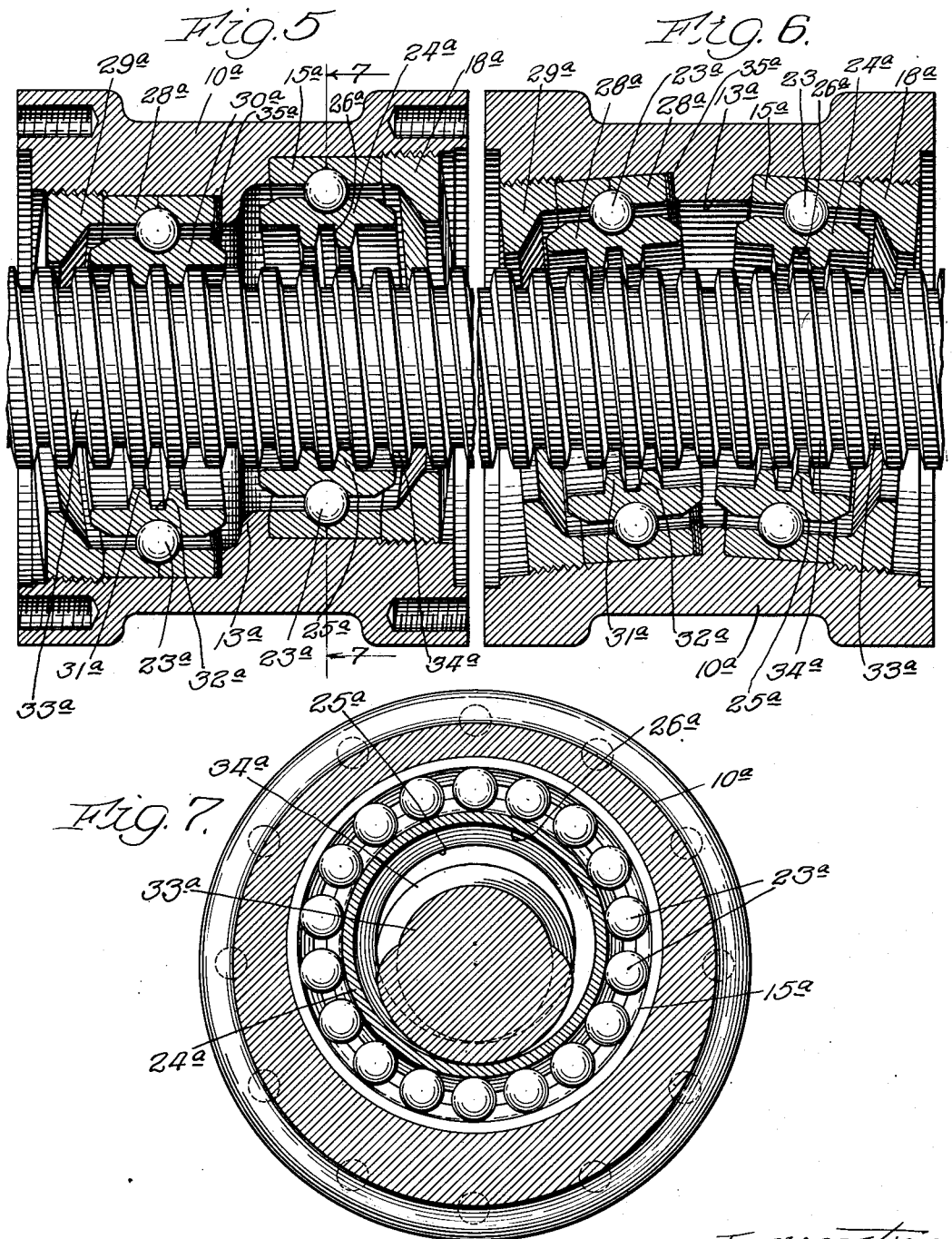

Patented Nov. 4, 1952

2,616,302

UNITED STATES PATENT OFFICE 2,616,302

ANTIFRICTION TRANSMISSION

Gunnar A. Wahlmark, Rockford, Ill., assignor to Sundstrand Machine Tool Co., Rockford, Ill., a corporation of Illinois Application March 6, 1947, Serial No. 732,854

6 Claims. (Cl. 74—459)

This invention relates to an anti-friction device, and more particularly to an anti-friction transmission.

It is an object of this invention to provide a screw type transmission of improved construction and arrangement.

Another object of the invention is to provide a screw type transmission having a low frictional loss.

Another object of the invention is to provide a screw type transmission in which the power transmitting member is in rolling contact with the screw.

Another object of the invention is to provide a screw type transmission in which the moving parts rotate in anti-friction bearings.

A further object of the invention is to provide a screw type transmission having the low frictional loss common to ball bearing drives, but in which any standard screw may be used on the power side.

A further object of the invention is to provide a screw type transmission which is readily adjustable for the elimination of backlash.

Other further objects of the invention will be apparent from the following description and drawings, in which:

Fig. 3 is a horizontal section of the device of Fig. 1 taken longitudinally of the screw;

Fig. 4 is a vertical section along line 4—4 of Fig. 1;

Fig. 5 is a figure like Fig. 1 showing another embodiment of the invention;

Fig. 6 is a horizontal section of the device shown in Fig. 5; and

Fig. 7 is a vertical section along line 7—7 of Fig. 5.

Figure 1:
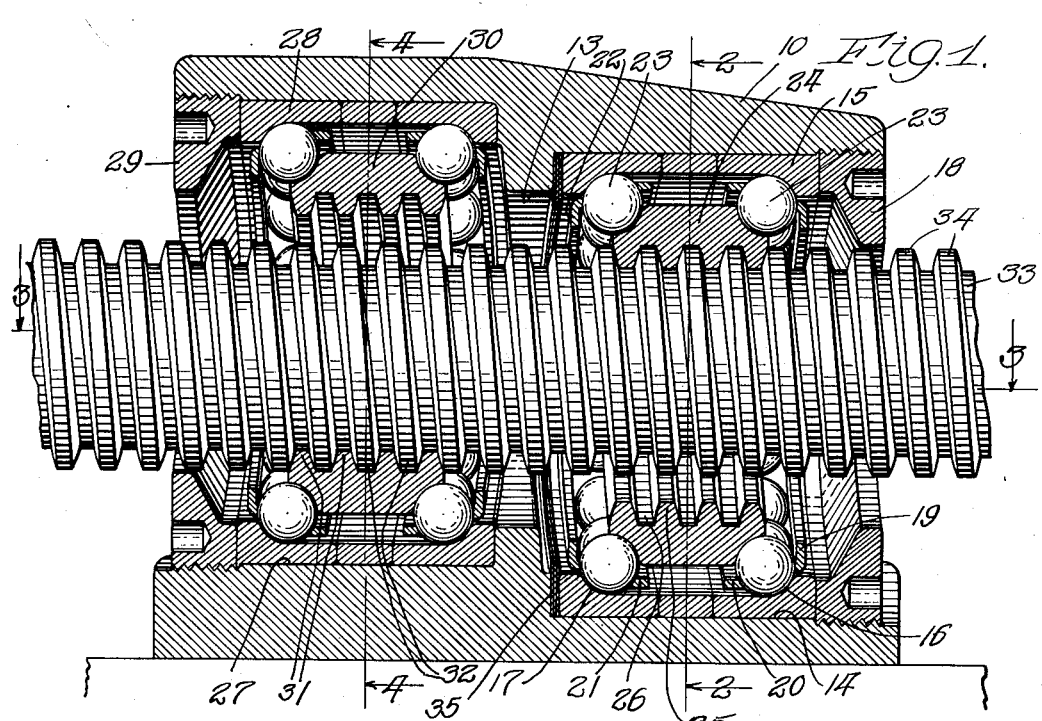
Fig. 1 is a vertical section taken longitudinally of the screw showing one form of the device.
Figure 2:
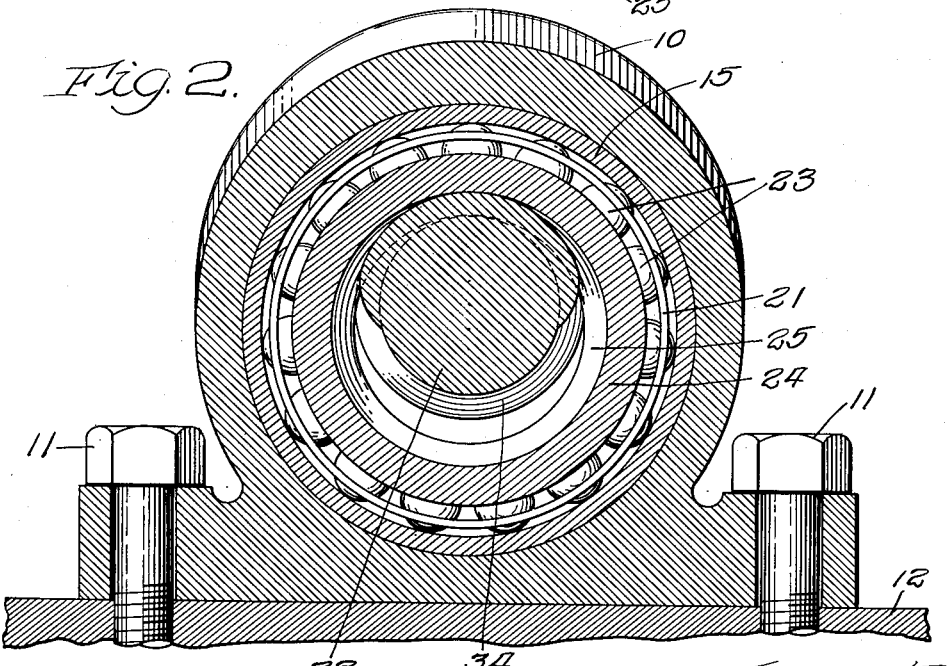
Fig. 2 is a vertical section transverse of the device along line 2—2 of Fig. 1.

While my invention is susceptible of embodiment in many different forms, I have shown in the drawings and will herein describe in detail two such embodiments, with the understanding that the present disclosure is to be considered as an exemplification of the principles of the invention and is not intended to limit the invention to the embodiments illustrated. The scope of the invention will be pointed out in the appended claims.

Referring now to Figs. 1 to 4 inclusive, 10 indicates a mounting adapted to be attached by means of bolts 11 to a member to be reciprocated. such as a work carrying table 12 of a machine tool. The mounting is provided with a bore 13 extending longitudinally therethrough and having a first recessed portion 14 in which is fitted a housing 15 carrying ball bearing raceways 16 and 17, and held in position in the recess 14 by a bushing 18 threading into the mounting 10. Two pairs of retaining rings 19 and 20, and 21 and 22 are provided to retain the ball bearings 23 in position. The housing 15 is preferably made in three parts as shown, in order to facilitate assembly. Mounted for rotation within the housing 15 and upon the ball bearings 23 is a screw engaging element 24 which is provided with a plurality of annular thread engaging means, comprising in the embodiment shown, the annular ribs 25, said ribs being without lead, and defining thread receiving channels 26 therebetween. Adjacent the other end of the bore 13 is a recess 27 in which a housing 28 is retained by a bushing 29, said elements 27, 28 and 29 being similar, respectively, to the elements 14, 15 and 18. A second screw engaging element 30 is mounted for rotation in a manner similar to the element 21, previously described, and it likewise is provided with a plurality of annular ribs 31 defining thread receiving channels 32 therebetween. Extending through the mounting 10 is a screw 33 having a thread 34 formed thereon, said screw being engaged on one of its sides by the screw engaging element 24 and on its opposite side by the screw engaging element 31. The screw is mounted to be rotated by a source of power (not shown) to provide the driving force for reciprocating the member 12. The screw engaging elements 24 and 30 being mounted for rotation upon ball bearings, and each being in engagement with only one side of the screw 33, when the screw is driven the elements 24 and 30 roll thereon, thus effecting transmission of power from the screw to the driven member with very low frictional loss.

As shown, the screw engaging elements 24 and 30 are preferably annular, of substantially larger diameter than the screw 33 which extends through them, and the thread engaging means are formed on their inner surfaces. Thus, contact of the element 24 with only one side of the screw 33 and contact of the element 30 with only the opposite side thereof is effectuated by displacing the recessed portions 14 and 27, in which are fixed the housings 15 and 28 containing respectively the elements 24 and 30, to opposite sides of the center of the bore 13, and consequently to opposite sides of the center of rotation of the screw. The ribs of the elements 24 and 30 have a larger diameter than the spindle of the screw 33, and the thread receiving channels of said elements have a larger diameter than that of the thread 34. Thus engagement of the thread 34 with the ribs 25 and 31 is afforded only by reason of the displacement of the elements 24 and 30 from the center of rotation of the screw 33; and the displacement to opposite sides causes the ribs 25 to engage the thread 34 only on one side of the screw (the upper side as seen in Fig. 1), while the ribs 31 engage the thread 34 only on the opposite side of the screw (the lower side as seen in Fig. 1). As best seen in Fig. 3, each of the recessed portions 14 and 27 for the housings 15 and 28 is oriented at an angle with respect to the axis of the screw 33, the angle of each being equal to the pitch of the screw, and the recesses and housings being oppositely angled with respect to the axis of the screw. Since the angle of orientation of each recessed portion 14 and 27 is equal to the pitch of the screw, the axis of each recess is perpendicular to the helix of the thread at a point on the thread. The recesses are displaced to opposite sides of the axis of the screw; so that the thread engaging ribs 25 of the element 24 engage the thread 34 of the screw only where the sidewall of the recess 14 is closest to the screw, and similarly the ribs 31 of the element 30 engage the thread 34 only where the sidewall of the recess 27 is closest to the screw. Since, as seen in Fig. 4, the member 30 and housing 28 are concentric with the side wall of the recess 27, and parallel to it (as is clearly shown in Fig. 3), the axis of the recess 27 is oriented perpendicular to the helix of the thread at the point where the sidewall of the recess is nearest the screw; so that the annular ribs 31 are substantially parallel with the helix of the thread 34 at their area of engagement therewith. Similarly, the annular ribs 25, which engage the thread 34 on the opposite side from that engaged by the ribs 31, are likewise substantially parallel with the helix at their area of engagement therewith.

It is to be noted that satisfactory power transmission could be obtained with only a single housing, as 28, together with the associated ball bearings and screw engaging element 30. However, elimination of backlash is an important element in a power transmission device of the screw type; and by using two screw engaging elements, adjustment of the components to eliminate backlash is simply accomplished by using shims 35 in back of the housing 15 so as to achieve any desired spacing between the screw engaging elements 24 and 30.

In the embodiment shown in Figs. 5 to 7 inclusive, like parts have been given like numerals as in the previous figures, but with the letter "a" added. In this embodiment, there are but two annular ribs 25a and 31a on each of the screw engaging elements 14a and 30a; and each of these pairs of ribs defines a single annular thread receiving channel 23a and 32a.

The elements 14 and 28 are free to rotate with rotation of the screw. Movement of the mounting 10, and hence the member 12, is achieved with little frictional loss. It can be seen that a given point on the thread engaging means which is in mesh with a portion of the thread 34 will travel to the right or left (depending upon the direction of rotation of the screw), a distance corresponding to the pitch of the thread. However, after the thread engaging means have moved through a certain arc, that point becomes separated from the thread 34, which separation reaches its greatest extent at a point removed 180° from the point of closest mesh. During the rotation of that particular point on the thread engaging means in which it is not in mesh with the thread, the mounting will continue to travel in the same direction, due to the fact that the other parts of the thread engaging means are engaged with the thread and are likewise being moved by the rotation of the screw.

I have discovered that frictional losses in a transmission of the type just described can be reduced about 90% below that in the conventional screw and nut drive; a great deal of this improvement being due to the fact that there is no sliding of thread upon thread, as in the conventional drive. At the same time, my device provides a more positive transmission of power from the screw than can be obtained with common ball bearing nut arrangements in which the ball bearings form the means of contact between the thread of the screw and the member to be moved, and permits the use of a standard screw rather than the specially threaded screw which is required in the conventional ball bearing nut. The preferred screw for my device is the standard Acme, in which the thread has a side angle 14½° from a line perpendicular to the axis of the screw.

I claim:

1. An anti-friction device comprising, a screw having a thread formed thereon, a mounting surrounding said screw, said mounting having a pair of spaced recesses each of which is eccentric to the axis of the screw and has its axis substantially perpendicular to a plane which is parallel to the helix of the thread where the thread is closest to the sidewall of said recess, and a substantially annular thread engaging member surrounding the screw and in rolling engagement with the thread on one side thereof, said thread engaging member being anti-frictionally mounted concentric with and perpendicular to the axis of said recess.

2. An anti-friction device according to claim 1 wherein the axes of said recesses are on opposite sides of the axis of the screw.

3. An anti-friction device according to claim 2 wherein one of the thread engaging members is longitudinally adjustable with respect to the other of said members.

4. In a machine tool having a slidable member to be reciprocated, means for reciprocating said member comprising, a screw adjacent said member, said screw having a thread formed thereon, a mounting on said member surrounding said screw, said mounting having a pair of spaced recesses each of which is eccentric to the axis of the screw and has its axis substantially perpendicular to a plane which is parallel to the helix of the thread where the thread is closest to the sidewall of said recess, and a substantially annular thread engaging member surrounding the screw and in rolling engagement with the thread on one side thereof, said thread engaging member being anti-frictionally mounted concentric with and perpendicular to the axis of said recess.

5. A machine tool according to claim 4 wherein the axes of said recesses are on opposite sides of the axis of the screw.

6. A machine tool according to claim 5 wherein one of the thread engaging members is longitudinally adjustable with respect to the other of said members.

GUNNAR A. WAHLMARK.

(References on following page)

REFERENCES CITED

The following references are of record in the file of this patent:

UNITED STATES PATENTS

| Number | Name | Date |
|---|---|---|
| 511,679 | Buckley | Dec. 26, 1893 |
| 522,249 | Buckley | July 3, 1894 |
| 1,079,883 | Sayer et al. | Nov. 25, 1913 |
| 1,140,646 | Abernathy | May 25, 1915 |
| 1,918,587 | Bryant | July 18, 1933 |
| 2,027,562 | Smith, Jr. | Jan. 14, 1936 |
| 2,131,151 | Smith | Sept. 27, 1938 |
| 2,134,748 | Baxter | Nov. 1, 1938 |
| 2,477,701 | McCallum | Aug. 2, 1949 |
| 2,482,082 | Wahlberg | Sept. 13, 1949 |

FOREIGN PATENTS

| Number | Country | Date |
|---|---|---|
| 3,788 | Great Britain | Feb. 21, 1901 |